US008113580B1

(12) United States Patent
Pusateri

(10) Patent No.: US 8,113,580 B1
(45) Date of Patent: Feb. 14, 2012

(54) DISPOSABLE CHILD SEAT COVER

(76) Inventor: Nancy Pusateri, Fort Lauderdale, FL (US)

( * ) Notice: Subject to any disclaimer, the term of this patent is extended or adjusted under 35 U.S.C. 154(b) by 81 days.

(21) Appl. No.: 12/763,592

(22) Filed: Apr. 20, 2010

Related U.S. Application Data

(60) Provisional application No. 61/173,798, filed on Apr. 29, 2009.

(51) Int. Cl.
A47C 31/00 (2006.01)
A47D 1/10 (2006.01)
(52) U.S. Cl. .......... 297/219.12; 297/228.12; 297/256.17
(58) Field of Classification Search ............. 297/219.12, 297/228.12, 256.17, 219.1; 4/245.1
See application file for complete search history.

(56) References Cited

U.S. PATENT DOCUMENTS

| 711,981 | A | * | 10/1902 | Lankenau | ............ | 4/245.9 |
|---|---|---|---|---|---|---|
| 3,578,380 | A | | 5/1971 | Jacobus | | |
| 4,621,004 | A | | 11/1986 | Madsen | | |
| 4,840,841 | A | | 6/1989 | Madsen | | |
| 4,883,701 | A | | 11/1989 | Rankin et al. | | |
| 5,791,732 | A | * | 8/1998 | Lucree | ............ | 297/256.17 |
| 6,129,417 | A | | 10/2000 | Cohen-Fyffe | | |
| 6,142,565 | A | | 11/2000 | Rieder | | |
| 6,237,998 | B1 | * | 5/2001 | Aprile | ............ | 297/219.12 |
| 6,248,098 | B1 | | 6/2001 | Sayama | | |
| 6,491,996 | B2 | | 12/2002 | Digangi | | |
| 6,517,155 | B1 | | 2/2003 | Landine | | |
| 6,655,734 | B2 | | 12/2003 | Hunter et al. | | |
| 6,959,963 | B2 | | 11/2005 | Hunter et al. | | |
| 7,367,621 | B1 | | 5/2008 | Han-Dressor et al. | | |
| 2003/0227202 | A1 | * | 12/2003 | Endicott et al. | ............ | 297/256.17 |
| 2004/0262964 | A1 | * | 12/2004 | Ryan | ............ | 297/219.1 |
| 2006/0061161 | A1 | | 3/2006 | Hunter et al. | | |
| 2007/0215255 | A1 | | 9/2007 | Hunter et al. | | |
| 2008/0191529 | A1 | | 8/2008 | Guercia et al. | | |
| 2010/0109399 | A1 | * | 5/2010 | Rockwell et al. | ............ | 297/219.12 |

* cited by examiner

Primary Examiner — Milton Nelson, Jr.
(74) Attorney, Agent, or Firm — Gold & Rizvi, P.A.; H. John Rizvi; Glenn E. Gold

(57) ABSTRACT

A disposable child seat cover formed of a single sheet of preferably plastic material, which can be dispensed from a continuous web of material forming multiple disposable child seat covers, is provided. The disposable child seat cover has two central expandable leg openings and two opposing longitudinal perforations divided by bisecting perforations. The perforations allow the user to easily create two front ties and two back ties from the longitudinal sides of the single sheet. The ties are utilized to secure the disposable child seat cover to a public child seat, such as a shopping cart seat or high chair. The disposable child seat cover is designed to effectively protect the child from germs and grime, while being sufficiently economical to allow retail establishments to provide complimentary disposable child seat covers to their customers.

16 Claims, 4 Drawing Sheets

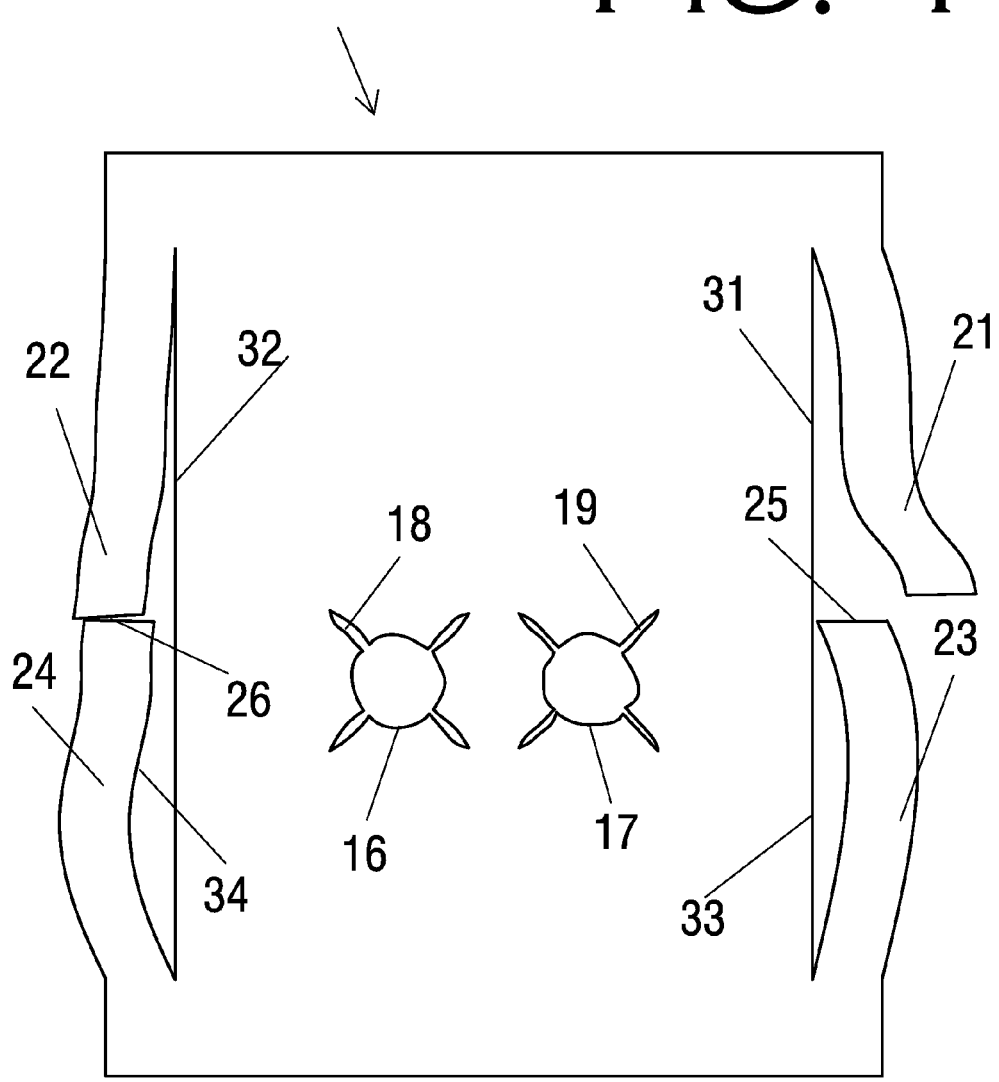

DISPOSABLE CHILD SEAT COVER

CROSS-REFERENCE TO RELATED APPLICATION

This application claims the benefit of U.S. Provisional Patent Application Ser. No. 61/173,798, filed on Apr. 29, 2009, which is incorporated herein in its entirety.

BACKGROUND OF THE INVENTION

1. Field of the Invention

The present invention relates generally to disposable hygienic products, and more particularly, to a disposable seat cover for a baby or child, particularly suited for use in a public child seat, such as a shopping cart and/or a restaurant high chair.

2. Description of the Prior Art

Babies and other young children are commonly brought on family shopping trips, so retail stores customarily provide a shopping cart having an integral child seat near the cart handle in the back of the cart. Although convenient, the cleanliness of the child seat has been shown in several studies to be severely lacking. Usually numerous other children have recently used the child seat, often chewing on the surfaces or spilling drinks on the seat or contaminating it with cold or flu viruses, bacteria, and/or dirt. Shoppers inadvertently transfer illness-causing microorganisms to the cart simply by using it for its intended purpose. Additionally, customers not having a child in the cart may place raw meats in the child seat, with the juices dripping onto the seat leaving dangerous (and increasingly antibiotic-resistant) campylobacter, salmonella, or other bacteria.

Likewise, restaurant high chairs may be similarly soiled with germs and food or drink residue. Further, restaurant high chairs are often wooden and worn, raising the possibility of splinters.

In the desire to protect babies and children; numerous washable decorative fabric child seat covers are available. Also, disposable seat covers mimicking the fabric seat covers are available. Both washable and disposable child seat covers have openings for the child's legs and cover all or most of the seat. Often they are particularly formed to fit a single type of seat. Also, it is inconvenient and time consuming to wash a fabric cover after each use, and, without washing, it remains contaminated from touching the seat. Additionally, it is difficult to remember to bring the freshly washed seat cover for each shopping trip or to restock the diaper bag with more disposable covers. Further, the available disposable covers are not economical and not recyclable. Therefore, it would be advantageous for the retail stores or restaurants to provide a disposable, recyclable seat cover to protect babies, as currently hand sanitizers or disposable bibs are often provided. However, this is not presently feasible due to the cost per conventional disposable seat cover.

Accordingly, there is an established need for a practical, convenient child seat cover adaptable to a variety of seat types and capable of effectively protecting babies and young children from germs, dirt, and splinters, yet inexpensive enough to be provided complimentarily by the retail stores and restaurants.

SUMMARY OF THE INVENTION

The present invention is directed to a practical disposable, recyclable child seat cover formed of a single sheet of preferably plastic material that is capable of effectively protecting the child from germs and dirt, while being sufficiently economical to allow retail establishments to provide complimentary disposable child seat covers to their customers. The disposable child seat cover is formed of a single sheet of preferably plastic material that can be torn by a user off a roll of a continuous web of material configured with multiple disposable child seat covers.

The disposable child seat cover has two central expandable leg openings and two opposing longitudinal perforations divided by bisecting perforations. The perforations allow the user to easily create two front ties and two back ties from the longitudinal sides of the single sheet. The ties are utilized to secure the disposable child seat cover to a public child seat, such as a shopping cart seat or high chair.

An object of the present invention is to provide a disposable child seat cover that can be adapted for use with a wide variety of child seats, particularly public child seats, such as conventional shopping carts or high chairs.

A further object of the present invention is to provide a disposable child seat cover that is very inexpensive.

Another object of the present invention is to provide a disposable child seat cover that is quickly and easily adaptable to be installed in a shopping cart or high chair.

An additional object of the present invention is to provide a disposable child seat cover that can be dispensed off a roll.

A further object of the present invention is to provide a disposable child seat cover that is recyclable.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 4 is a top view showing the preferred embodiment of the disposable child seat cover of the present invention, with the ties and enlarged leg holes created by use of the perforations.

Like reference numerals refer to like parts throughout the several views of the drawings.

DETAILED DESCRIPTION OF THE PREFERRED EMBODIMENTS

Shown throughout the figures, the present invention is directed toward a convenient, recyclable, disposable child seat cover that is capable of efficiently protecting a child from germs and dirt in a public child seat, while being sufficiently economical to allow retail establishments to provide complimentary disposable child seat covers to their customers. The disposable child seat cover of the present invention is adapted and easily usable with a wide variety of child seats, including public child seats, such as shopping cart child seats and high chairs.

Figure 1:
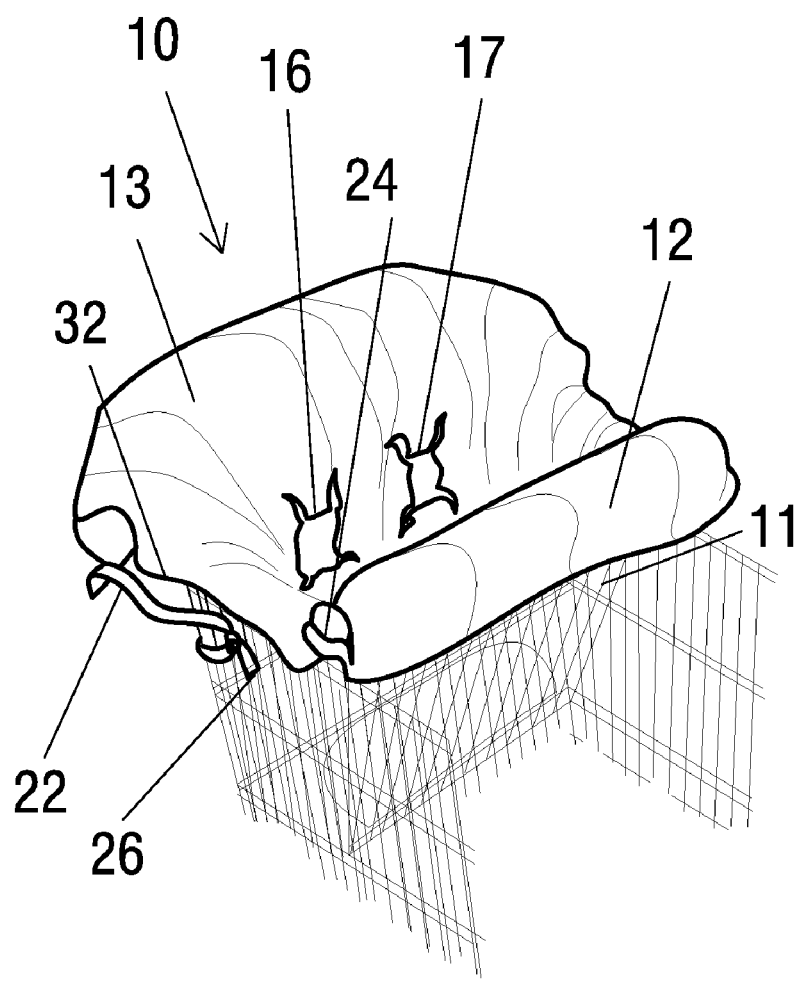
FIG. 1 is a perspective view showing a preferred embodiment of the disposable child seat cover of the present invention as installed in a shopping cart child seat.

Referring now to FIG. 1, a disposable child seat cover, shown generally as reference number 10, is illustrated in accordance with a preferred embodiment of the present invention. A single disposable child seat cover 10 is shown in use in a public child seat, a shopping cart seat 11, forming protection over the shopping cart seat bottom, with a cover back section 12 spread over the shopping cart seat back and a front cover section 13 spread over the shopping cart handle. A first leg hole 17 and second leg hole 16 are positioned to fit the two leg holes of the shopping cart. Forward ties 24, 23 (FIG. 2) and rearward ties 21, 22 (FIG. 2) are provided to secure the disposable child seat cover 10 to the shopping cart, allowing maximum flexibility and adaptability to any shopping cart design.

Figure 2:
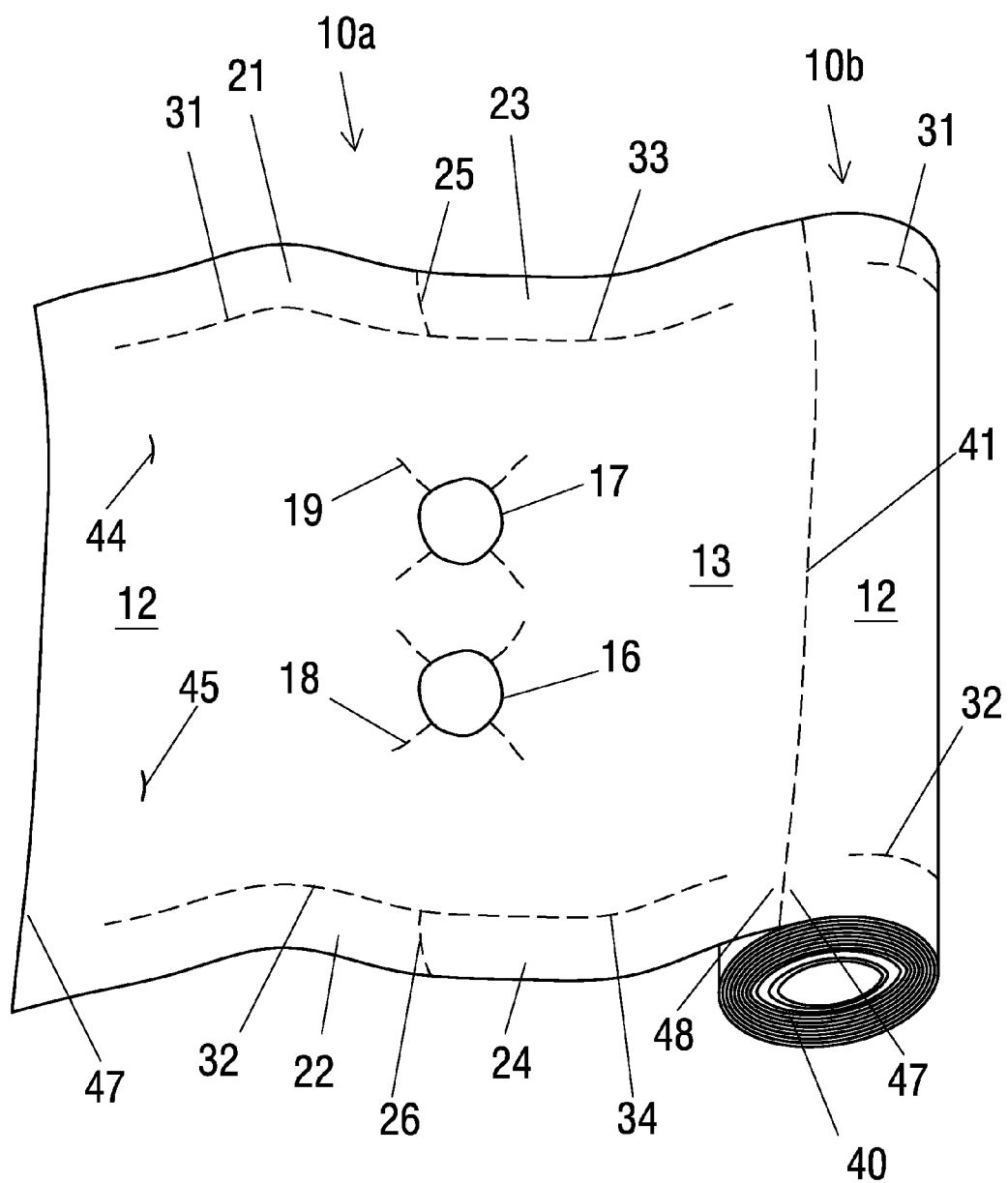
FIG. 2 is a perspective view of a roll of multiple disposable child seat covers of the present invention.

Referring now to FIG. 2, multiple disposable child seat covers 10 are formed from (and manually removable from) a single sheet of preferably recyclable plastic material, with a continuous web of material 40 forming a plurality of adjacent disposable seat covers 10a, 10b . . . 10n. The adjacent disposable seat covers 10a, 10b . . . 10n are preferably separated by a dividing perforation facilitating convenient manual removal of a single disposable child seat cover 10 from the continuous web of material 40. The continuous web of material 40 forming the plurality of adjacent disposable seat covers 10a, 10b . . . 10n is preferably wound around a central axis to form a roll, as illustrated, for convenience in transport, storage, and dispersal. Such a roll of material might be conveniently placed at a store (or restaurant) entrance to allow parents to obtain protection for their child from any harmful microorganisms or dirt on the public child seat in a shopping cart (or high chair). The parent can easily remove a single disposable child seat cover 10 from the continuous web of material 40 by utilizing dividing perforation 41. The disposable child seat cover 10 can be manufactured in any color (including clear, for stores that may want to prevent theft by issuing clear covers) or in any pattern or with any logo (such as a store might desire for advertisement).

Each disposable child seat cover 10 is configured with two central expandable leg openings 16, 17, two opposing longitudinal perforations, (first longitudinal perforation 31, 33 and second longitudinal perforation 32, 34, and preferably two seat belt slits 44, 45 to accommodate a seat belt that may be supplied on the high chair or cart.

The first longitudinal perforation 31, 33 and second longitudinal perforation 32, 34 are generally parallel with the longitudinal edges of a single disposable child seat cover and somewhat inset inwardly from the disposable child seat cover longitudinal edges, as illustrated. The inset is approximately 1 to 4 inches, preferably between 2 and 3 inches, but may depend on the particular material used. However, the first longitudinal perforation 31, 33 and second longitudinal perforation 32, do not extend to the lateral edges 47, 48 of the disposable child seat cover 10 formed by dividing perforation 41, as illustrated, but end at a point somewhat inset from the lateral edges 47, 48.

Each opposing longitudinal perforation is bisected by a lateral perforation 25, 26. The first longitudinal perforation 31, 33 is bisected by a first bisecting perforation 25. Similarly, the second longitudinal perforation 32, 34 is bisected by a second bisecting perforation 26. The positioning of these perforations allow the manual creation of ties 21, 22, 23, 24 to secure the disposable child seat cover 10 to a public child seat. Using the first bisecting perforation 25, the forward part of first longitudinal perforation 33 allows the formation of first forward tie 23 and the rearward part of first longitudinal perforation 31 allows the formation of first rearward tie 21. Using the second bisecting perforation 26, the forward part of second longitudinal perforation 34 allows the formation of second forward tie 24, and the rearward portion of second longitudinal perforation 32 allows the formation of second rearward tie 22.

Leg openings 16, 17, are disposed in a generally central area of the disposable child seat cover 10, but preferably positioned somewhat nearer the front than the rear of disposable child seat cover 10, to allow sufficient rearward material to accommodate the space required for the public child seat back and the public child seat bottom. Leg openings 16, 17 are sized to accommodate a small child's legs, but are preferably manually modifiable and/or expandable by use of leg opening perforations 18, 19 to create a slightly larger leg hole, if needed. Leg opening perforations 18, 19 preferably extend radially from the circumference of leg openings 16, 17, respectively. Although four leg opening perforations 18 are shown on leg opening 16 and four leg opening perforations 19 are shown on each leg opening 17, other numbers of leg opening perforations are within the scope of the invention.

Although dividing perforation 41, first longitudinal perforation 31, 33, second longitudinal perforation 32, 34, leg opening perforations 18, 19, and lateral bisecting perforations 25, 26 are herein described as "perforations" for conciseness, the word "perforation" is not meant in a limiting way, but to describe any and all possible separation aids, which includes cuts, splits, slashes, patterned holes, score lines, penetrations, score lines, etc., made by any means in the continuous web of material 40.

Figure 3:
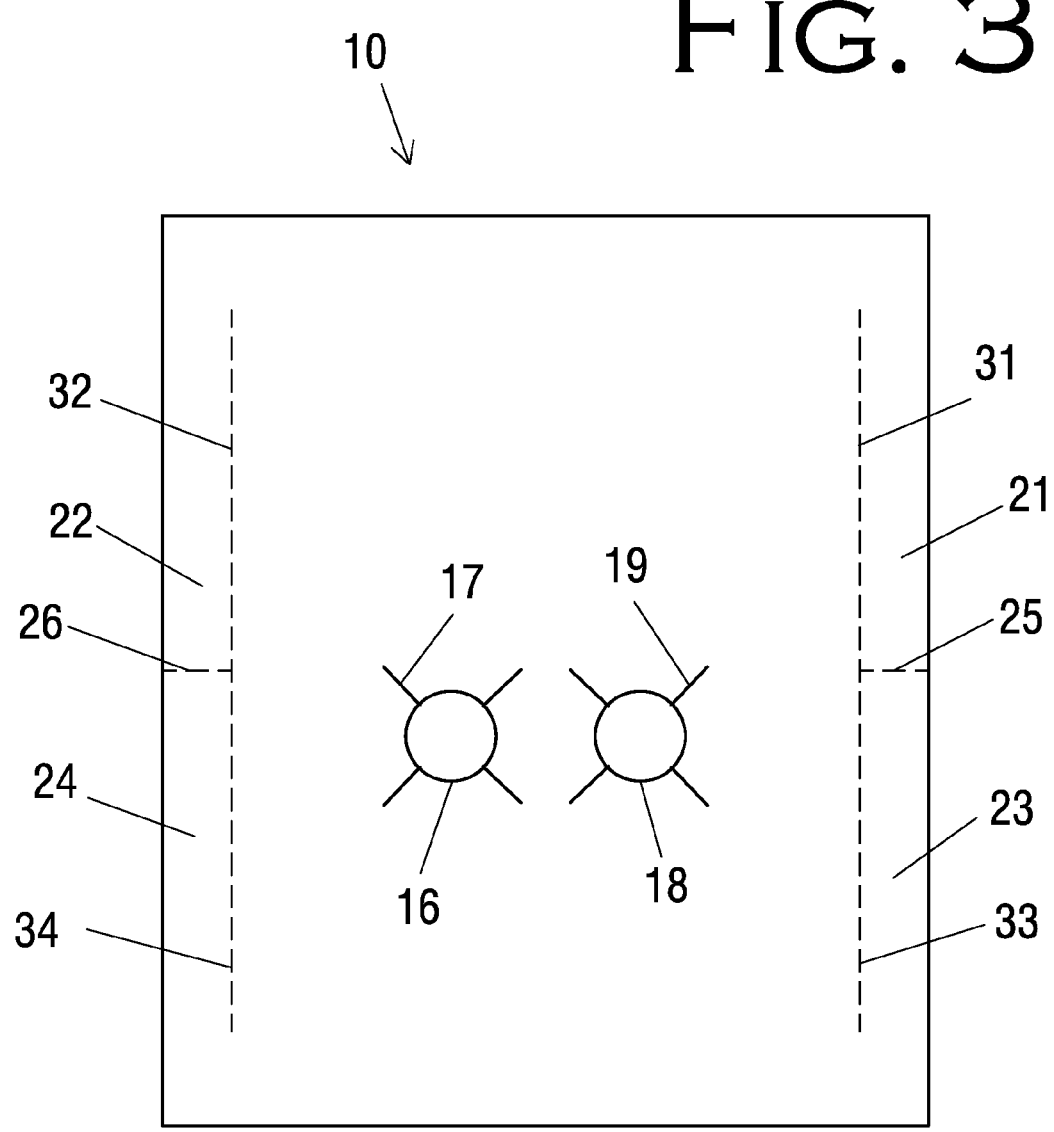
FIG. 3 is a top view showing the preferred embodiment of the disposable child seat cover of the present invention intact and without the ties created.

Preferably, the disposable child seat cover includes two seat belt slits 44, 45 (FIG. 2). The seat belt slits 44, 45 are disposed in a back section 12 of the disposable child seat cover to allow child safety belts that are attached to the public child seat to be more readily usable. Optionally, FIG. 3, FIG. 4, the disposable child seat cover 10 can be formed without the seat belt slits.

To use the disposable child seat cover 10 of the present invention, a user removes a single disposable child seat cover 10 from a continuous web of material 40 (or alternatively, a single disposable child seat cover 10 previously separated from the continuous web of material 40 may be presented to the user). The user first forms the ties 21, 22, 23, 24 (FIG. 3-FIG. 4) in any order. The first bisecting perforation 25 is torn, thereby allowing the forward part of first longitudinal perforation 33 to be split from the central portion of the disposable child seat cover forming first forward tie 23 and the rearward part of first longitudinal perforation 31 to be split from the central portion of the disposable child seat cover forming first rearward tie 21. The second bisecting perforation 34 is torn, thereby allowing the forward part of second longitudinal perforation 24 to be split from the central portion of the disposable child seat cover forming second forward tie 24 and the rearward part of second longitudinal perforation 32 to be split from the central portion of the disposable child seat cover forming second rearward tie 22.

The user then positions leg openings 16, 17 over the leg openings of the public child seat, and spreads and distributes the remainder of the central portion of disposable child seat cover to fit the particular public child seat to be used. If desired, a cover back section 12 is spread over the back of the public child seat and a front cover section 13 is spread over the front of the public child seat. The ties 21, 22, 23, 24 are then tied to secure the disposable child seat cover to the public child seat. The ties 21, 22, 23, 24 can be used for several methods of tying, based on the requirements presented by the particular public child seat to be used. They may by tied over the disposable child seat cover or under the disposable child seat cover. They may be tied around available posts or bars.

They may be tied together. A great deal of flexibility is furnished to the user both in tying methods and in positioning the disposable child seat cover in an optimal way for the situation presented by the public child seat (for instance, allowing a particularly dirty area to be well covered).

If needed, the user can adjust the size of leg openings 16, 17 by opening leg opening perforations 18, 19 to fit the child's legs. The child can then be easily positioned within the public child seat with sanitary protection provided by the disposable child seat cover 10. If provided by the public child seat, each side of the child safety belt can then be inserted into one of the seat belt slits 44, 45, with the child safety belt brought to the front of the child and the engagement mechanisms engaged (other methods of installing the child seat belt may be required, depending on the particular design of the provided child seat belt.

From the foregoing, it will be apparent that the disposable child seat cover 10 of the current invention provides a sanitary protective device that is conveniently usable in, and easily adaptable to, a wide variety of child seats, particularly public child seats, such as shopping cart seats or restaurant seats.

Further, the disposable child seat cover is very inexpensive, due to the material used and to the fabrication within a continuous web of material 40.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A child seat cover comprising a sheet of thin material, wherein said sheet has a first longitudinal edge, an opposing second longitudinal edge, a first lateral edge, and an opposing second lateral edge, said sheet comprising:
    a first bisecting perforation extending inward from a generally central area of said first longitudinal edge;
    a first longitudinal perforation generally parallel to said first longitudinal edge, wherein said first longitudinal perforation is centrally disposed and somewhat shorter than said first longitudinal edge, wherein a generally middle area of said first longitudinal perforation substantially abuts an inward-facing end of said first bisecting perforation, and wherein said first longitudinal perforation and said first bisecting perforation are configured to allow a user to manually create a first front tie and a first back tie;
    a second bisecting perforation extending inward from a generally central area of said second longitudinal edge;
    a second longitudinal perforation generally parallel to said second longitudinal edge, wherein said second longitudinal perforation is centrally disposed and somewhat shorter than said second longitudinal edge, wherein a generally middle area of said second longitudinal perforation substantially abuts an inward-facing end of said second bisecting perforation, and wherein said second longitudinal perforation and said second bisecting perforation are configured to allow a user to manually create a second front tie and a second back tie;
    a right leg hole disposed within a central area of said sheet having right leg hole opening perforations configured to allow an increase in size of said right leg hole;
    a left leg hole disposed within a central area of said sheet having left leg hole opening perforations configured to allow an increase in size of said left leg hole.

2. The child seat cover comprising a sheet of thin material, as recited in claim 1 further comprising two slits disposed in a central rearward area of said sheet and configured to allow insertion of a child seat belt.

3. The child seat cover comprising a sheet of thin material, as recited in claim 1, wherein said sheet is transparent.

4. The child seat cover comprising a sheet of thin material, as recited in claim 1, wherein said sheet is printed with a design.

5. The child seat cover comprising a sheet of thin material, as recited in claim 1, wherein said sheet is disposable.

6. The child seat cover comprising a sheet of thin material, as recited in claim 1, wherein said first longitudinal perforation, said first bisecting perforation, said second longitudinal perforation, and said second bisecting perforation are formed of score lines.

7. The child seat cover comprising a sheet of thin material, as recited in claim 1, wherein said first longitudinal perforation, said first bisecting perforation, said second longitudinal perforation, and said second bisecting perforation are formed of spaced penetrations.

8. The child seat cover comprising a sheet of thin material, as recited in claim 1, wherein said sheet is attached to at least one contiguous sheet adapted to form an additional child seat cover.

9. The child seat cover comprising a sheet of thin material, as recited in claim wherein said sheet is formed of a biodegradable plastic.

10. A method to install a seat cover for a child, comprising:
    presenting a continuous series of sheets for use, the continuous series of sheets comprising a first sheet and a second sheet formed as a continuous web of thin material having at least one lateral perforation disposed between said first sheet and said second sheet to facilitate separating said first sheet from said second sheet, wherein said first sheet is configured with a first longitudinal perforation bisected by a first bisecting perforation, a second longitudinal perforation bisected by a second bisecting perforation, and wherein said first sheet is configured with two generally centrally located leg holes for receiving the lees of said child;
    removing said first sheet from said second sheet by tearing along said at least one lateral perforation disposed therebetween;
    creating a first front tie and a first back tie by separating said first longitudinal perforation from the central portion of said first sheet and by separating said first front tie from said first back tie by using said first bisecting perforation;
    creating a second front tie and a second back tie by separating said second longitudinal perforation from the central portion of said first sheet and by separating said second front tie from said second back tie by using said second bisecting perforation;
    spreading said first sheet within a child seat in a manner to substantially cover said child seat and with said leg holes corresponding to child seat leg openings;
    using said first front tie, said first back tie, said second front tie, and said second back tie to tie said first sheet onto said child seat.

11. The method to install a seat cover for a child, as recited in claim 10, wherein said first sheet is further configured with two slits disposed in a central rearward area of said first sheet and configured to allow insertion of a child seat belt there through, and further comprising inserting said child seat belt into at least one of said two slits.

12. The method to install a seat cover for a child, as recited in claim 10, wherein said first sheet is formed of a transparent material.

13. The method to install a seat cover for a child, as recited in claim 10, wherein said first sheet is imprinted with a design.

14. The method to install a seat cover for a child, as recited in claim 10, wherein said first sheet is formed of a disposable material.

15. The method to install a seat cover for a child, as recited in claim 10, wherein said first sheet is formed of a biodegradable material.

16. The method to install a seat cover for a child, as recited in claim 10, wherein each of said two generally centrally located leg holes is configured with at least one leg opening perforation, and further comprising manually expanding the size of each of said two generally centrally located leg holes by separating said at least one leg opening perforation.

* * * * *